J. W. BROKAW.
Harvester Rake.
No. 18,070.
Patented Aug. 25, 1857.
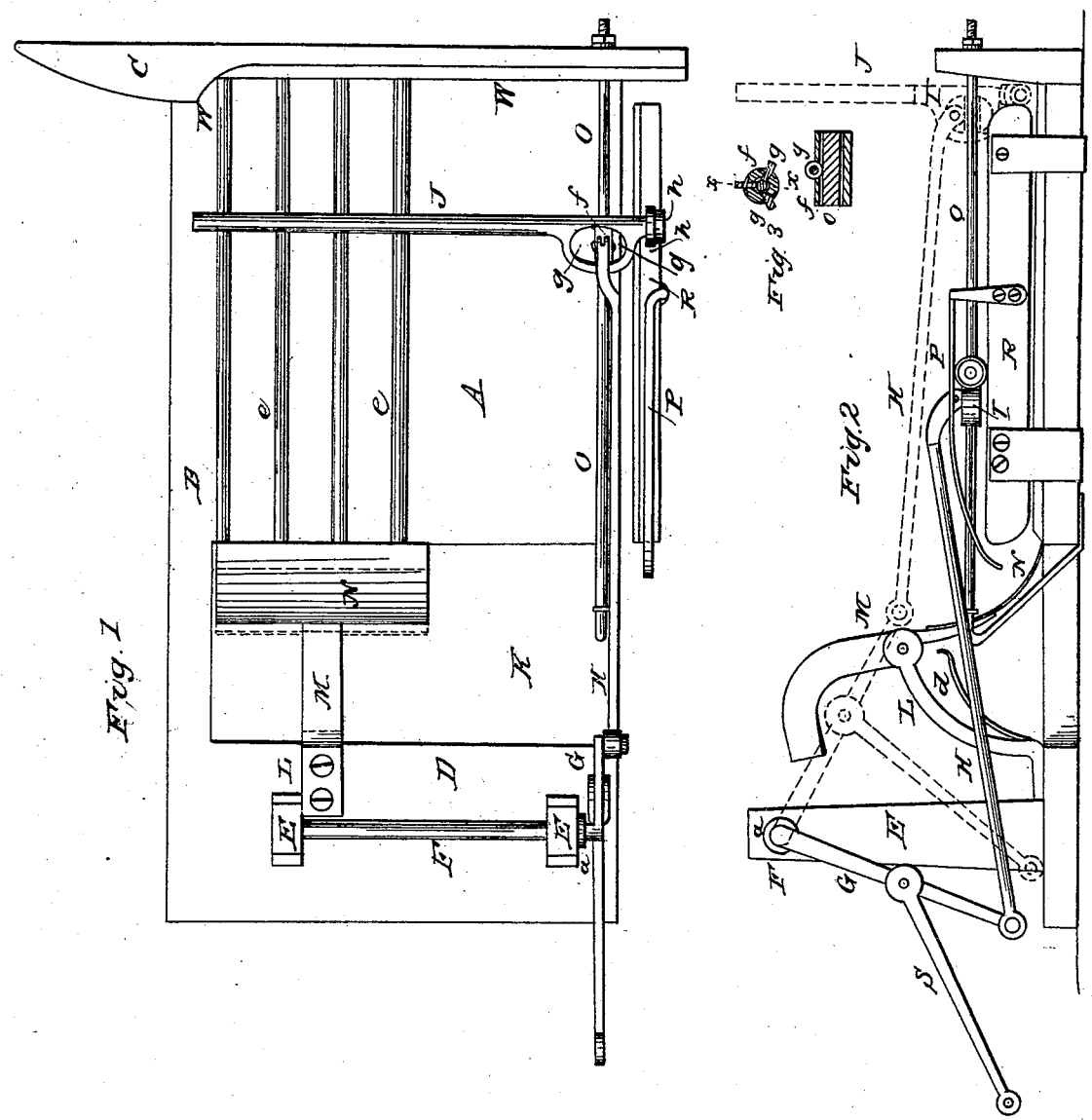

UNITED STATES PATENT OFFICE.

JOHN W. BROKAW, OF SPRINGFIELD, OHIO, ASSIGNOR TO WARDER, BROKAW & CHILD.

IMPROVEMENT IN AUTOMATIC RAKES FOR HARVESTERS.

Specification forming part of Letters Patent No. 18,070, dated August 25, 1857.

*To all whom it may concern:*

Be it known that I, JOHN W. BROKAW, of Springfield, in the county of Clarke and State of Ohio, have invented certain new and useful Improvements in Automatic Rakers for Harvesting-Machines, of which the following is a full, clear, and exact description, reference being had to the accompanying drawings, making a part of this specification, in which—

Figure 1 represents a plan of that portion of a harvesting-machine to which my improvements are applied; Fig. 2, a side elevation of the same, the operation of the rake being represented in red lines. Fig. 3 represents a vertical transverse section through the sliding guide-collar of the rake, friction-rolls, and guide-rod, and Fig. 4 a longitudinal section of the same through the line $x$ $x$ of Fig. 3.

My invention consists, first, in a peculiar arrangement of devices by which the rake is confined to its work in raking off the grain and raised up out of the way of the falling grain on its return to repeat the operation.

My invention also consists in arranging and combining in a peculiar manner a set of friction-rolls with the rake-head I, sleeve $f$, and guide-bar O, for the purpose of lessening the friction on the guide-bar and otherwise facilitating the working of the rake.

To enable others skilled in the art to make, construct, and use my invention, I will now proceed to describe its parts in detail.

The frame is represented as consisting of the usual platform, A, for the reception of the grain as it is cut; finger-bar B, for the support of the cutting apparatus, (not represented;) divider C, for the separation of the grain to be cut from that to be left standing; and platform D, for the support of the parts that operate the rake, for which purpose two standards, E, are erected upon it, into which bearings $a$ are formed for the shaft F, to the rear end of which the arm G is secured that communicates motion to the connecting-rod H of the frame I of the rake J through the crank $s$, attached to a crank-wrist on the driving-gear of the machine. The machine thus constructed presents the general appearance of a rectangular frame, the beams of which are firmly secured to each other, with the exception that a rectangular space, K, is left in the rear of the finger-bar between the platforms A and D, through which the grain is deposited as it is raked off the platform A by the rake.

On the side of the platform D next the space K, and near the cutter-bar B, is secured a bracket, L, having a forked head, between and to which is pivoted a weighted lever, M, to the lower end of which is secured a receiving-apron, N. The upper end of this lever is so formed as to have a tendency to force its lower end against the inner side of the platform A, and is so weighted as to hold it in that position until a sufficient quantity of grain to form a gavel has been thrown or collected upon it from the platform by the rake to force it back and allow the grain to drop upon the ground in a neat and compact bundle, thus preventing scattering of the grain in raking by a simple and effective plan, without entailing additional trouble to the attendant, which heretofore has been a great drawback to this class of machines; but, lest there may be a tendency of the apron to remain in a vertical position on being forced back in this manner by bringing the weighted end of the lever M in the line of gravity, a spring, $d$, is arranged in the rear of the apron in such manner as to give the apron the necessary recoil to bring the weight of the lever again in play. The spring $d$ may either be secured to the bracket L or platform D, as is deemed most advisable.

The rake J consists of a straight bar of wood or other suitable material, provided with teeth on its under side at proper intervals apart. The rake thus formed extends sufficiently far over the platform A to sweep the grain evenly off in a line at right angles to the cutter-bar, there being ribs $e$ formed on or otherwise secured to the upper side of the platform to facilitate its removal.

The rear end of the rake is securely attached by screw-bolts or otherwise to a frame, I, carrying a sleeve, $f$, mounted upon a guide-rod, O, the latter being secured at one end to the divider-beam of the frame of the machine and at its other end to the under side of the beam that supports the rear end of the platform, for which purpose it is deflected from the horizontal plane in which it runs from the other end and in a parallel line with the rear of the machine.

In the sleeve $f$ are formed slots, in which are arranged rolls g, which project slightly below its inner surface. These rolls rest upon the guide-rod O, thus giving to the sleeve, as it imparts motion to the rake J through the action of the connecting-rod H, the minimum degree of friction, in this way diminishing the power required to operate the rake and consequent straining of the machine and horses used in propelling it.

On the rear end of the rake-frame I, which extends considerably beyond the sleeve and guide-rod, is formed a journal, i, on which are mounted two friction-rolls, h and h', the latter being of smaller diameter than the former. These rolls, as the rake is operated, pass between a guide-spring, P, and guide-bar R, the former being arranged above and the latter below, both of which are required to be brought in contact with the rolls, the guide-bar to keep the rake down to its work during the operation of raking, and the spring-bar to deflect the rear end of the rake when the operation is completed, so as to raise its front end out of the way of the falling grain as it is forced back to repeat the raking operation. For this purpose the outer end of the spring-bar P has a downward curve, and is so arranged as to bear upon the outer friction-roll, h', so that as the latter reaches the outer end of the spring it is deflected by it and that end of the rake made to pass along between the guide-bar R and rear end of the platform until it reaches the end of the former, (which, during this operation, has been in a nearly vertical position,) when the weight of the rake brings it again into a horizontal position. Throughout this part of the operation the roll h, which is of greater diameter than the roll h', bears on the under side of the guide-bar and passes around its end, which is curved for this purpose and rolls over its upper surface as the rake traverses the platform to take off the grain. Were both rolls of the same diameter when they arrived between the bar and spring-guide, the action of one as a friction-roll would cease, seeing that it would bear equally against both unless the outer edge of the bar or spring-guide was beveled sufficiently to prevent contact; and should but one roll be used the same effect would be produced. The side of the platform next the standing grain is extended a sufficient distance beyond the end of the reel on that side to permit the rake to descend from its nearly vertical to its horizontal position between that side of the platform and end of the reel, thus obviating the necessity of twisting the rake-arm to permit it to descend without interfering with the reel or giving to the rake a longer stroke than is absolutely necessary to traverse the platform by extending its guides and other accessories, which would be otherwise the case. The reel, while it does not extend over the whole length of the platform, is still made long enough to overlap the divider to effectually gather the grain, support it during the action of the knives, and deposit it evenly and regularly upon the platform, the rear end of the divider being recessed to form the necessary space between the reel and platform for the rake.

Having thus described my invention, what I claim as new, and desire to secure by Letters Patent, is—

1. The arrangement of the spring-guide P and double guide-bar R, in combination with the rake-head I, carrying friction-rolls h and h', constructed, arranged, and operated in the manner substantially as set forth.

2. The friction-rolls g, in combination with the sleeve f, rake-head I, and guide-rod O, as arranged and operated for the purposes set forth.

In testimony whereof I have hereunto set my hand this 25th day of March, A. D. 1857.

J. W. BROKAW.

Witnesses:
P. HANNAY,
W. LEWIS.